No. 671,347. Patented Apr. 2, 1901.
H. C. MALSNESS.
GYRATORY BOLTING MACHINE.
(Application filed Apr. 18, 1898.)
(No Model.) 6 Sheets—Sheet 1.

Witnesses
a J Colbourne
[signature]

Inventor
H. C. Malsness
by Ridout & Maybee
attys

THE NORRIS PETERS CO., PHOTO-LITHO., WASHINGTON, D. C.

No. 671,347. Patented Apr. 2, 1901.
H. C. MALSNESS.
GYRATORY BOLTING MACHINE.
(Application filed Apr. 18, 1898.)
(No Model.) 6 Sheets—Sheet 2.

Witnesses
A. J. Colbourn
A. W. Neff

Inventor
H. C. Malsness
by Ridout & Maybee
Attys

No. 671,347. Patented Apr. 2, 1901.
H. C. MALSNESS.
GYRATORY BOLTING MACHINE.
(Application filed Apr. 18, 1898.)
(No Model.) 6 Sheets—Sheet 3.

Witnesses
A. J. Colbourne
G. N. Neff

Inventor
H. C. Malsness
by Ridout & Maybee
attys

No. 671,347. Patented Apr. 2, 1901.
H. C. MALSNESS.
GYRATORY BOLTING MACHINE.
(Application filed Apr. 18, 1898.)

(No Model.) 6 Sheets—Sheet 4.

Witnesses
A. J. Colbourne
A. W. Neff

Inventor
H. C. Malsness
by Ridout & Maybee
attys

No. 671,347. Patented Apr. 2, 1901.
H. C. MALSNESS.
GYRATORY BOLTING MACHINE.
(Application filed Apr. 18, 1898.)
(No Model.) 6 Sheets—Sheet 5.

Witnesses
a. J. Colbourne
a. n. neff

Inventor
H. C. Malsness
by
Ridout & Maybee
Attys

No. 671,347. Patented Apr. 2, 1901.
H. C. MALSNESS.
GYRATORY BOLTING MACHINE.
(Application filed Apr. 18, 1898.)
(No Model.) 6 Sheets—Sheet 6.

Witnesses
G. J. Colbourne
N. C. Dickson

Inventor
H. C. Malsness
by Ridout & Maybee
Attys

THE NORRIS PETERS CO., PHOTO-LITHO., WASHINGTON, D. C.

UNITED STATES PATENT OFFICE.

HARVEY C. MALSNESS, OF STRATFORD, CANADA.

GYRATORY BOLTING-MACHINE.

SPECIFICATION forming part of Letters Patent No. 671,347, dated April 2, 1901.

Application filed April 18, 1898. Serial No. 677,995. (No model.)

*To all whom it may concern:*

Be it known that I, HARVEY CHRISTOPHER MALSNESS, of the city of Stratford, in the county of Perth and Province of Ontario, Canada, have invented certain new and useful Improvements in Gyratory Bolting-Machines, of which the following is a specification.

My invention relates to that class of sifting and bolting machines for treating and separating ground grain and like substances in which one or more inclined sieves are arranged in a sieve-box and are provided with means for producing a horizontal rotary swinging motion of the box without actual rotation about its axis.

The object of my invention is to so construct the machine as to render it simple and convenient in operation, highly efficient in action, and capable of handling separately any number of separations of the different grades of material at one and the same time in the smallest space; and the invention consists in the construction, arrangement, and combinations of parts, as hereinafter described and then definitely claimed.

Figure 1:
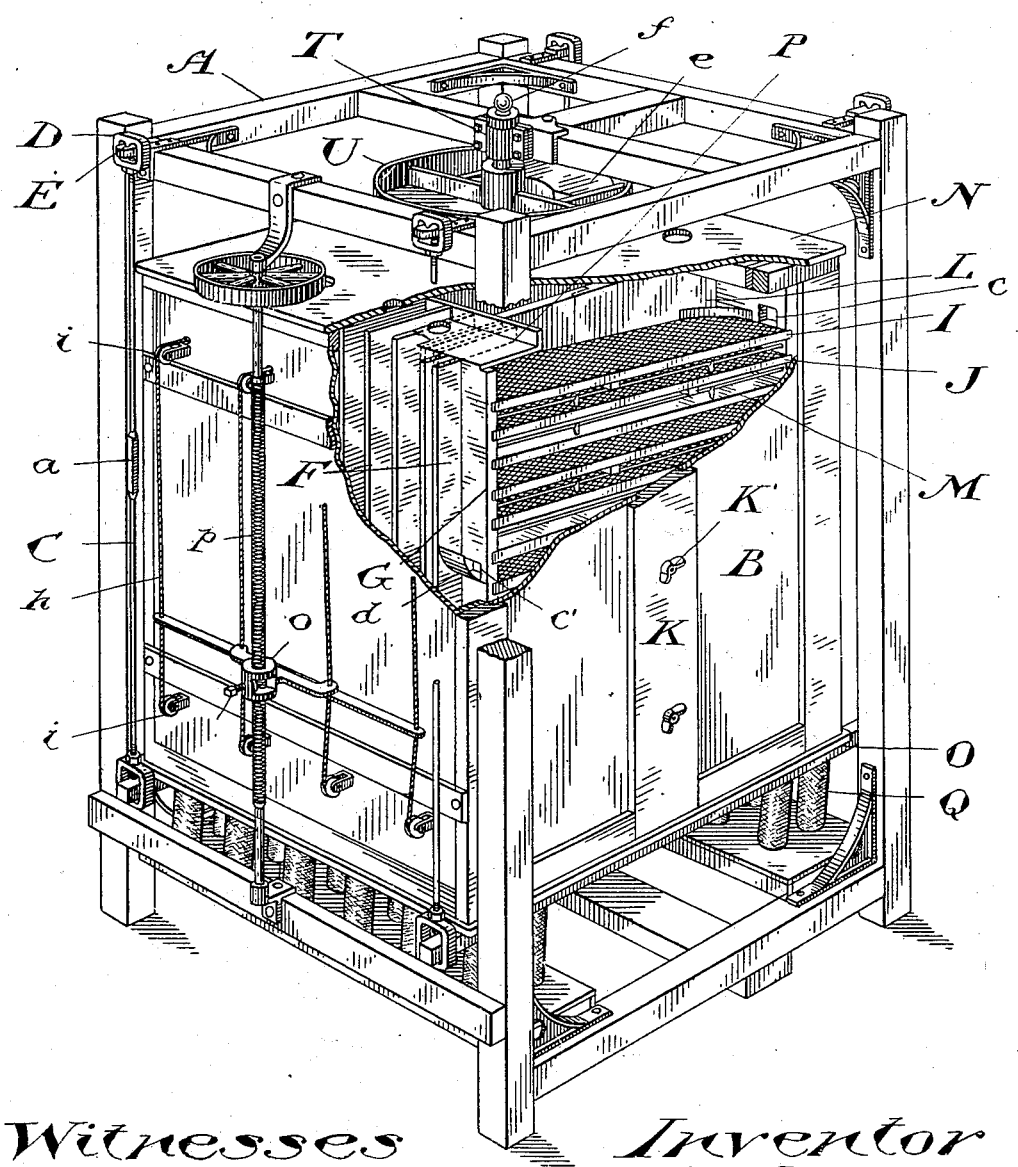
Figure 2:
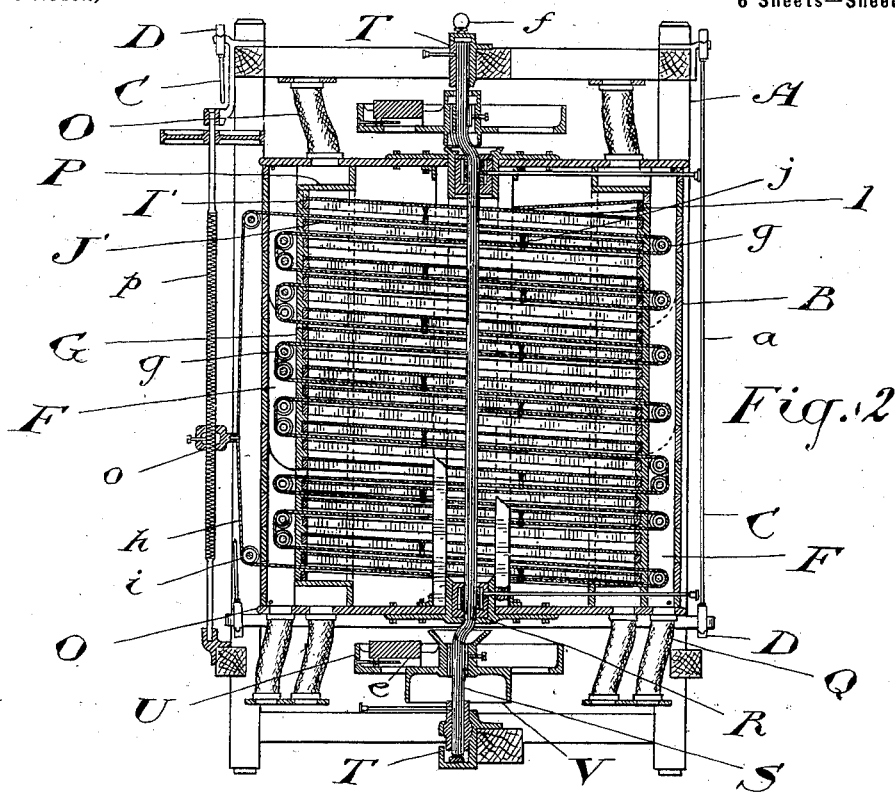
Figure 3:
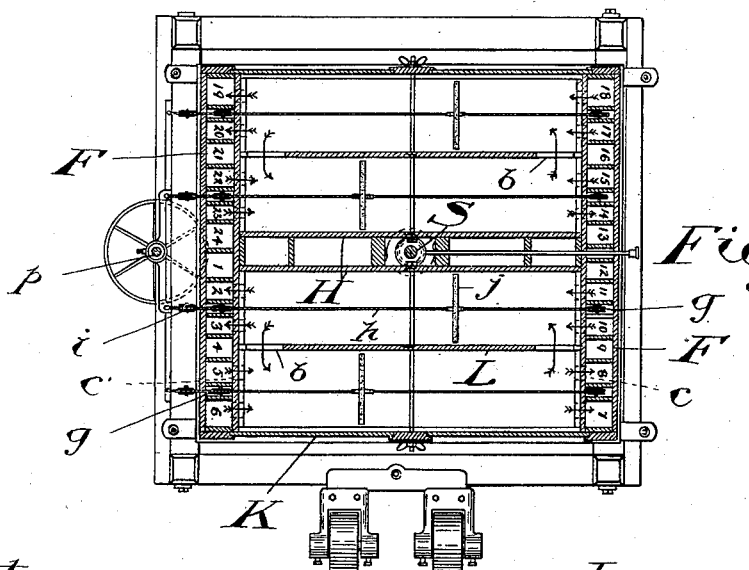
Figure 4:
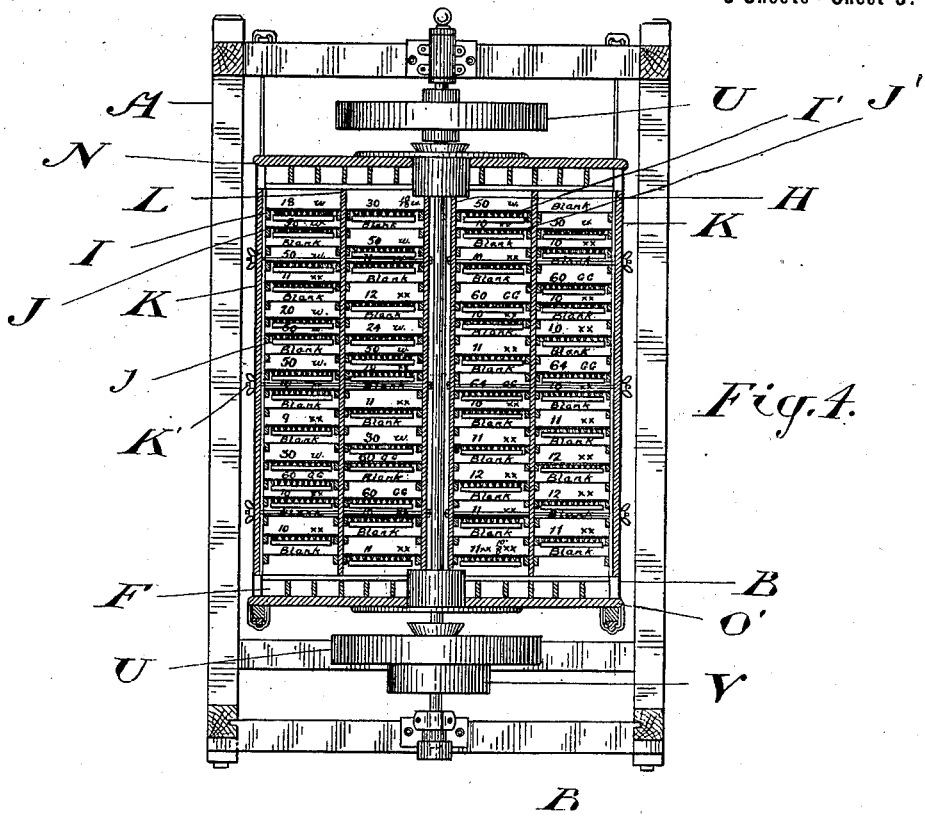
Figure 5:
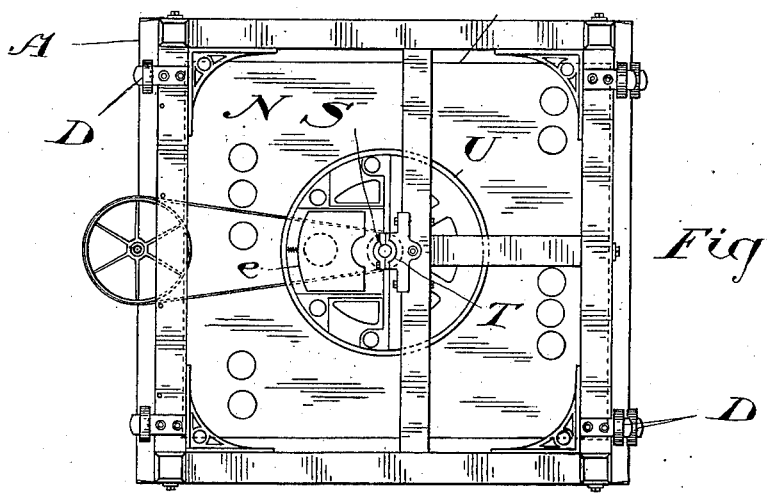
Figure 6:
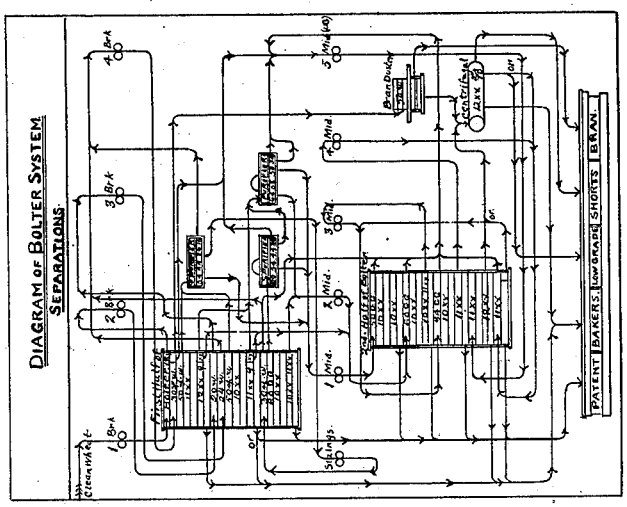
Figure 1:
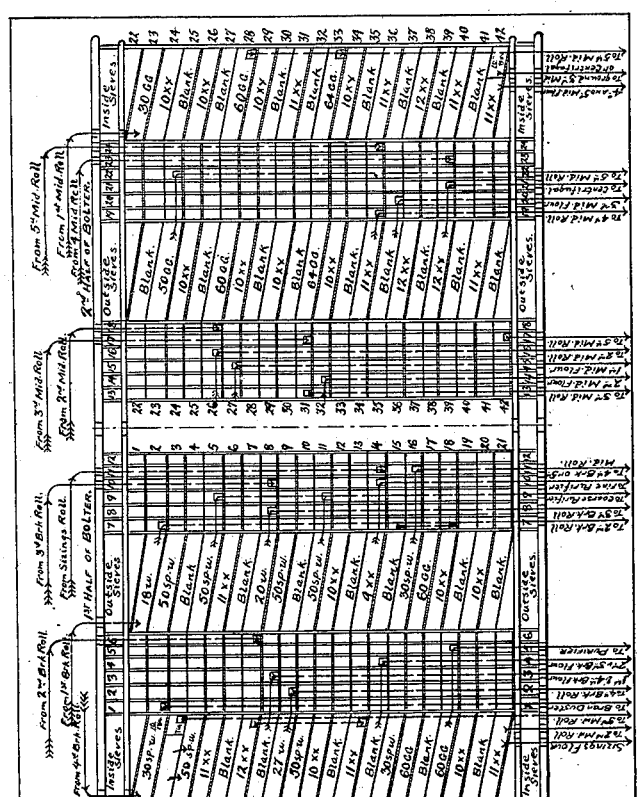
Figure 8:
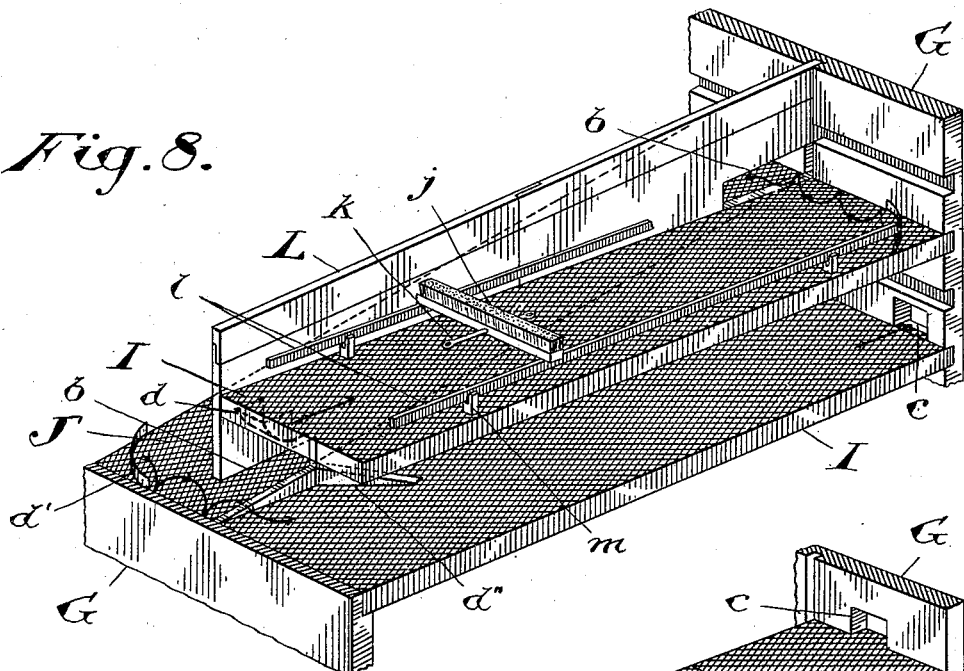
Figure 9:
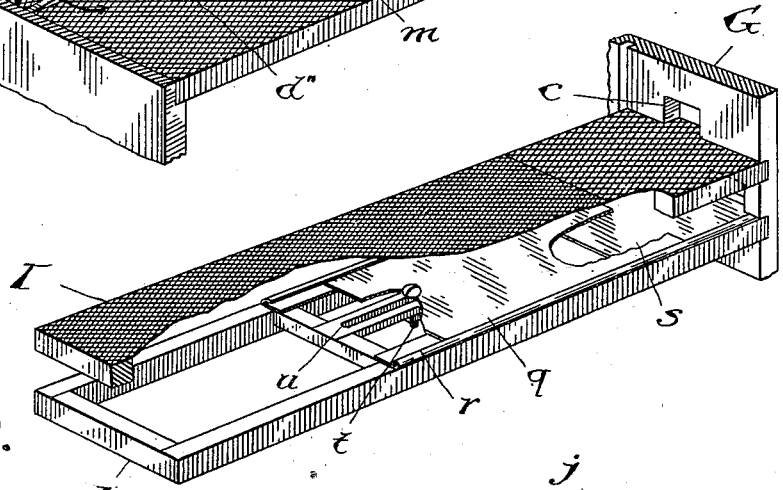
Figure 10:
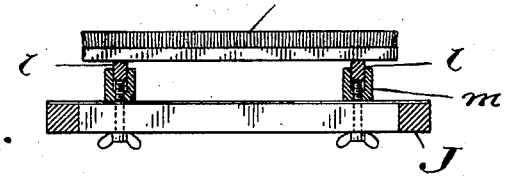
Figures 11, 12, 13:
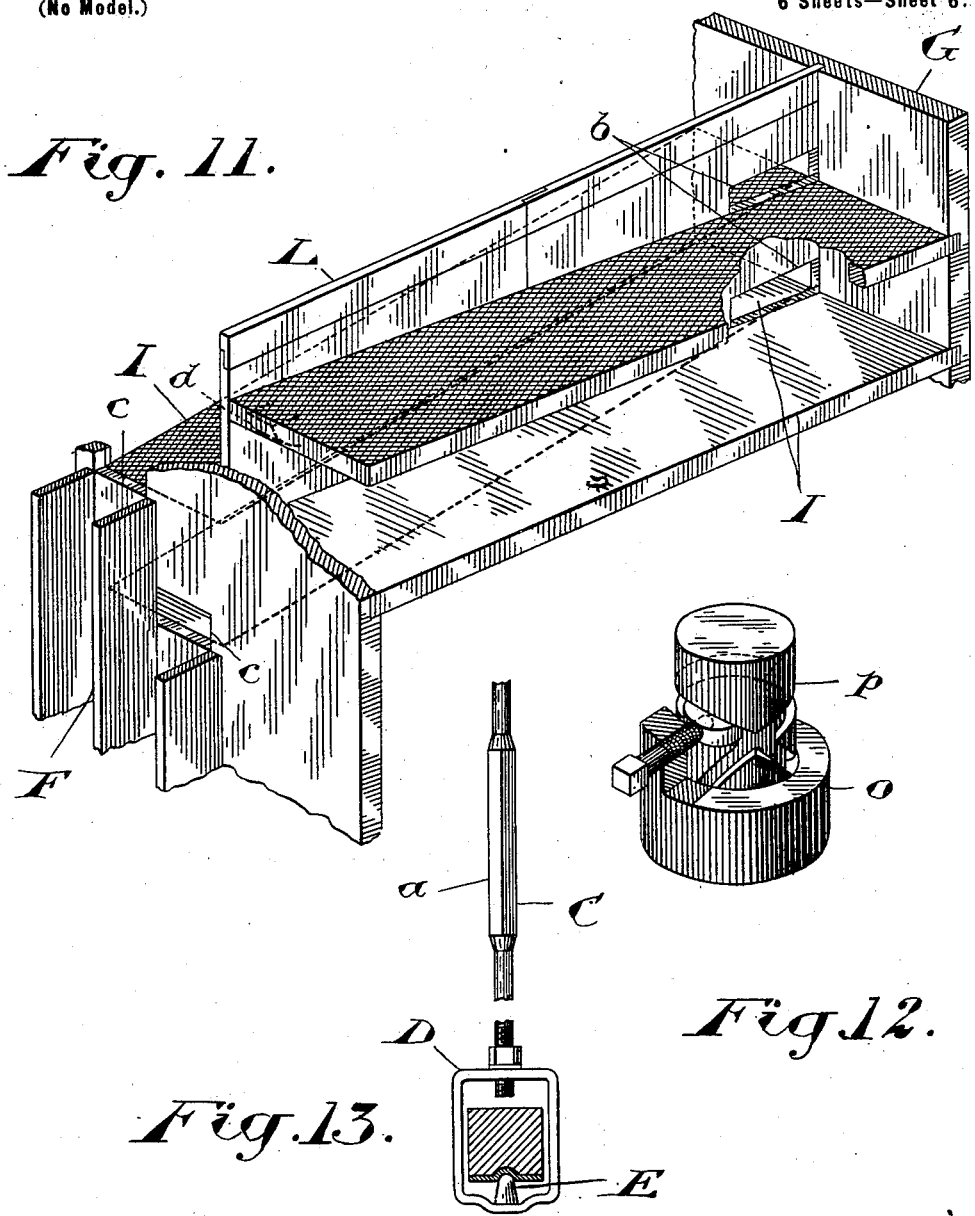

In the accompanying drawings, Figure 1 is a perspective view of my invention, showing the sieve-box mounted in a suitable supporting-frame, a portion of the box being broken away to expose the interior construction. Fig. 2 is a sectional elevation of my machine through the long way of the sieve-box. Fig. 3 is a sectional plan of my machine. Fig. 4 is a sectional elevation of my machine through the narrow way of the sieve-box. Fig. 5 is an exterior plan view of the machine. Fig. 6 is a diagram of separations, showing the improved system for use in flour-milling. Fig. 7 is a projection of the bolting-surface in the machine corresponding with the diagram shown in Fig. 6. Fig. 8 is a perspective detail of three of the sieves, showing the continuous-circuit travel of the stock. Fig. 9 is a perspective detail showing an adjustable cut-off. Fig. 10 is a sectional elevation showing an adjustment to control the tension of the brush against the sieves. Figs. 11, 12, and 13 are details which will be referred to hereinafter.

In the drawings like letters of reference indicate corresponding parts in the different figures.

A is a stout hard-wood frame for the support of the sieve-box B, which is suitably driven, as hereinafter described.

C represents rods formed with right and left hand threaded ends and squared central portions $a$, by which they may be turned. The ends of these rods C are screwed into stirrups D, connected by ball-and-socket joints E with the top of the frame and the lower side of the sieve-box, as shown. By adjusting the rods the hang of the sieve-box may be accurately adjusted and its weight equalized while in motion. The sieve-box is preferably constructed of light pine and is partitioned off at the ends and divided into a number of spouts F. The partitions G, dividing the spouts from the screens, form substantially the end of the sieve-box so far as the sieves are concerned. These partitions G are grooved to receive the two outside series of inclined sieves I J and the two inside series of oppositely-inclined sieves I' J'. It will be seen that these are duplicated at each side of the machine, each half forming practically an entirely separate apparatus. The two parts are separated by the partitions H.

K represents the sides of the sieve-box, which are suitably held in position by rods K', extending through them from the partitions H and provided with suitable nuts by means of which the sides can be securely clamped in position.

The screens at each side of the machine are separated by the partition L, which is preferably made so that it can be readily removed to gain access to the inner screens.

Reference to Figs. 1, 2, 4, and 8 will show that the tail ends of each of the sieves of the series I I' are substantially on a level with the head of the corresponding sieve upon the opposite side of the partition. The same holds good of the sieves of the series J J'.

Through the partition L at the tail end of any desired sieve I form an opening $b$, so that when the apparatus is in motion, as hereinafter described, the stock will pass freely from the tail end of the sieve in question onto the head of the opposite and oppositely-inclined sieve on the other side of the partition. When the stock in traveling over the first sieve reaches the end of the same, the circular motion of the machine being, for instance, with the sun would cause the stock to describe half-circles in a direction against the sun along the partition G at the foot of the sieve, the inclined surface keeping the stock against said partition and compelling it to go forward till it passes through the opening and travels down the sieve upon the opposite side of the partition, as indicated by arrows. Thus a continuous-circuit travel is given the stock over an inclined cloth surface of square sieves without losing fall or height in passing the stock from one sieve to the other.

It is well known that stock may be passed from the tail end of one sieve onto the head of an oppositely-inclined sieve directly below it; but in such a case there is a great waste of space, and the capacity of such a machine is therefore very limited.

It will be seen that in Fig. 8 the openings $b$ are so arranged that the stock travels continuously over three sieves before tailing out at the opening $c$ into one of the spouts at the end of the sieve-box. The openings $b$ can be so arranged as to permit of the stock passing over as many of the sieves as may be desired.

A reference to Figs. 2, 4, and 7 will show that the sieves of the second series of both the inner and outer sieves are principally blanks to catch and tail off the stock passing through the sieves of the first series.

Wherever necessary, curved guides $d'$ are placed on the sieves to direct the stock to the various openings. Distributing-bars $d''$ may also be placed on the sieves, onto which the openings $b$ discharge. (See Figs. 1 and 8.)

I do not claim any special novelty in the means of introducing the stock into the sieve-box and withdrawing it therefrom. Whenever it may be desired, any one of the spouts F may be caused to communicate with any desired sieve by means of an opening $c'$ (see Fig. 1) above the curved false bottom $d$ in the chute, so that stock may be thereby conveyed to the head of the sieve. In the same way tailings may be removed from any desired sieve by means of an opening such as already referred to.

Whenever it be desired to remove from the machine the stock which has passed through one or more sieves, I insert below them a blank sieve M, which is made to tail off into one of the spouts F. I show in the drawings of the machine only so much of the spouting as is necessary to illustrate the principles of operation. By reference to Figs. 6 and 7 a practical miller will readily understand how the machine may be arranged for a complete system of separations and how the spouting may be arranged to suit the same.

N and O' are the top and bottom, respectively, of the sieve-box, in which are formed holes with which communicate the flexible bags O. Ledges P are preferably formed at the tops of the partitions G, through which the stock may be dropped onto the top sieves or from which it may be shaken into the spouts F. The bottom of the machine is also provided with suitable openings with which are connected the flexible bags Q.

As it is desirable to have the operation of the machine entirely under control, it is necessary to provide an adjustable cut-off, such as shown in Fig. 9. Below one of the sieves I place a sieve-frame provided with a plate $q$, movable in the guides $r$. The lower end of this plate overlaps the stationary plate $s$. In order to clamp the plate $q$ in any desired position, I provide the bolt $t$, which passes through the plate and through a slot formed in the stationary bar $u$. When the plate is moved, by tightening the bolt and nut the plate may be securely held. At the lower end of the sieve above may be placed a section of wire or cloth of much coarser mesh than the general surface of the sieve. Thus material passing through the head of the sieve may be allowed to drop through to a lower sieve, while more or less of the material passing through the center and coarse part of the sieve may be intercepted and tailed off to any desired point. The coarse-mesh portion at the tail of the sieve permits all but the coarsest tailings to fall through onto the adjustable cut-off to be discharged separately to any desired point.

Connected to the top and bottom of the sieve-box are the eccentric boxes R, preferably provided with brass linings adjustable to take up wear. Through these boxes runs the cranked driving-shaft S, carried in suitable bearings T on the frame A. Secured to the shaft S are the balance-wheels U, provided with adjustable balance-weights $e$, so that the balance of the machine may be accurately adjusted. The shaft is preferably driven by a pulley V, connected thereto below the lower balance-wheel.

The means provided for oiling the bearings is novel, consisting in placing a large sight-feed lubricator $f$ over the top of the driving-shaft. This lubricator is set to feed the required amount of oil which follows the shaft down to the bearings through ducts provided in the balance-wheels to the bearings on the sieve-box and through to the step-bearing upon the frame.

On opposite sides of the sieve-box I place a series of pulleys $g$ and pass around them an endless cord $h$, which is taken back to one side of the machine and passed around the pulleys $i$. The pulleys $g$ are so located that a portion of the cord is below each of the sieves. Connected to a portion of the cord below each sieve is a brush $j$. (Shown in detail in Figs. 8 and 10.) This brush has a stiff rod $k$ connected to it centrally, to the ends of which the cord $h$ is connected. This rod tends always to maintain the brush at right angles to the direction of travel. The back of the brush $j$ rests upon the guides $l$, which are vertically movable in the supports $m$ by means of the set-screws $n$. Thus the guides $l$ may be set to give the brush any desired degree of tension against the lower side of the sieve above it. By reciprocating the portion of the cord between the pulleys $i$ it is evident that the brushes will be caused to travel alternately from end to end of the sieves, thus always keeping the cloth clean, which is something that has never before been accomplished in any rotary machine of this nature.

$o$ (see Figs. 1, 2, and 12, and particularly Fig. 12) is a casting carrying a swivel adapted to engage with the right and left hand thread formed upon the vertical shaft $p$. By the rotation of this shaft the swivel and casting are given a reciprocating motion up and down the said shaft, so as to suitably operate the cord $h$. This shaft has suitable bearings on the frame A and is driven by suitable driving pulleys and belt from the driving-shaft S. As the machine is provided with four sets of sieves, four cords $h$ are used and the casting $o$ is provided with a cross-bar to which the various cords are connected, as shown in Fig. 1.

From the above description and the accompanying drawings it will be seen that I have devised a machine for the intended purpose which is very efficient and easily operated and one that will be found desirable and convenient in actual operation.

It is evident that the exterior appearance in the details of construction could be materially changed without departing from the spirit of my invention. The frame, for instance, may be either independent, as shown, or the sieve-box may be suspended from part of the building.

By the use of my flour-bolter a single machine can be made to take all the separations from the entire system in a mill of as great capacity as one hundred and fifty barrels in twenty-four hours, or more, which has never before been accomplished.

What I claim as my invention is—

1. In a sifting and bolting machine, the combination with a sieve-box provided with a series of sieves, and with means whereby it may be given a gyratory motion; of a series of brushes located one below each sieve; an endless cord to which all the brushes are connected; a series of sheaves journaled on the sieve-box and about which the cord is carried, a portion of the cord running from a sheave near the upper end of the box to a sheave near the lower end of the box; and means connected to some stationary part for reciprocating the said portion of the cord, substantially as and for the purpose specified.

2. In a sifting and bolting machine, the combination of a sieve-box provided with two central vertical partitions between which the driving-shaft is located, and ends having a series of grooves formed therein on each side of the said partitions; two rows of sieves on each side of the center having their ends inserted in the said grooves; removable partitions between the rows of sieves; removable sides for the sieve-box; and bolt-rods extending from the central partitions through the removable partitions and sides, so that the parts may be securely clamped together, substantially as and for the purpose specified.

3. In a sifting and bolting machine, the combination of a sieve-box provided with two central vertical partitions between which the driving-shaft is located, and ends having a series of grooves formed therein on each side of the said partitions; rows of sieves on each side of the center having their ends inserted in the said grooves; removable sides for the sieve-box and bolt-rods extending from the center partitions through the removable sides, so that the parts may be securely clamped together, substantially as and for the purpose specified.

4. In a sifting and bolting machine, the combination with a sieve-box provided with a removable side and a removable sieve, of a brush; guides carried by a removable sieve or frame and adapted to support the said brush beneath the said sieve; and a cord connected to the said brush by means of which it may be reciprocated longitudinally under the said screen, substantially as and for the purpose specified.

Stratford, Canada, April 6, 1898.

HARVEY C. MALSNESS.

In presence of—
BEATRICE MACFARLANE,
J. A. DAVIDSON.